United States Patent [19]

Bauduin

[11] Patent Number: 4,737,849
[45] Date of Patent: Apr. 12, 1988

[54] PROCESS AND A PERIODIC INSTANT REGENERATION CIRCUIT

[75] Inventor: Jean-Pierre A. Bauduin, Combourg, France

[73] Assignee: Etablissement Public de Diffusion dit "Telediffusion de France", France

[21] Appl. No.: 677,195

[22] Filed: Dec. 3, 1984

[30] Foreign Application Priority Data

Dec. 15, 1983 [FR] France .............................. 83 20254

[51] Int. Cl.$^4$ .............................................. H04N 5/04
[52] U.S. Cl. ...................................... 358/148; 358/147; 358/153
[58] Field of Search ............... 358/147, 153, 154, 155, 358/20, 158, 148; 328/165, 164

[56] References Cited

U.S. PATENT DOCUMENTS 4,166,250 8/1979 Meki et al. ........................ 328/165
4,520,394 5/1985 Kaneko ............................. 358/147

FOREIGN PATENT DOCUMENTS 0022723 1/1981 European Pat. Off. .
0074039 3/1983 European Pat. Off. .
2086177 5/1982 United Kingdom .

Primary Examiner—James J. Groody
Assistant Examiner—David E. Harvey
Attorney, Agent, or Firm—Laff, Whitesel, Conte & Saret

[57] ABSTRACT

A process for regenerating a periodic signal creates two signals. The first signal provides for the detection of a periodic signal for a short time preceding the theoretical timing position of the periodic signal. The second signal is transmitted a very short time after the theoretical timing position of the periodic signal and serves as a substitute periodic signal, when the periodic signal has not been detected prior to a transmission of the second signal. The circuit, used to receive broadcasted digital data, is comprised of a counter (L), a D flip-flop (B1) and a clock (CLX) having a frequency which is equal to a multiple of the data bit rate which is to be received. The counter (L) has an initializing input connected to the Q output of the flip-flop (B1). It has two outputs (X, Y) corresponding to the transmissions of the first and second signals. The first output (X) is connected to the "1" setting input while the second output is connected to the "0" resetting input of flip-flop (B1), having a D input which is connected to a "0" level voltage. The clock input receives the periodic signal.

2 Claims, 3 Drawing Sheets

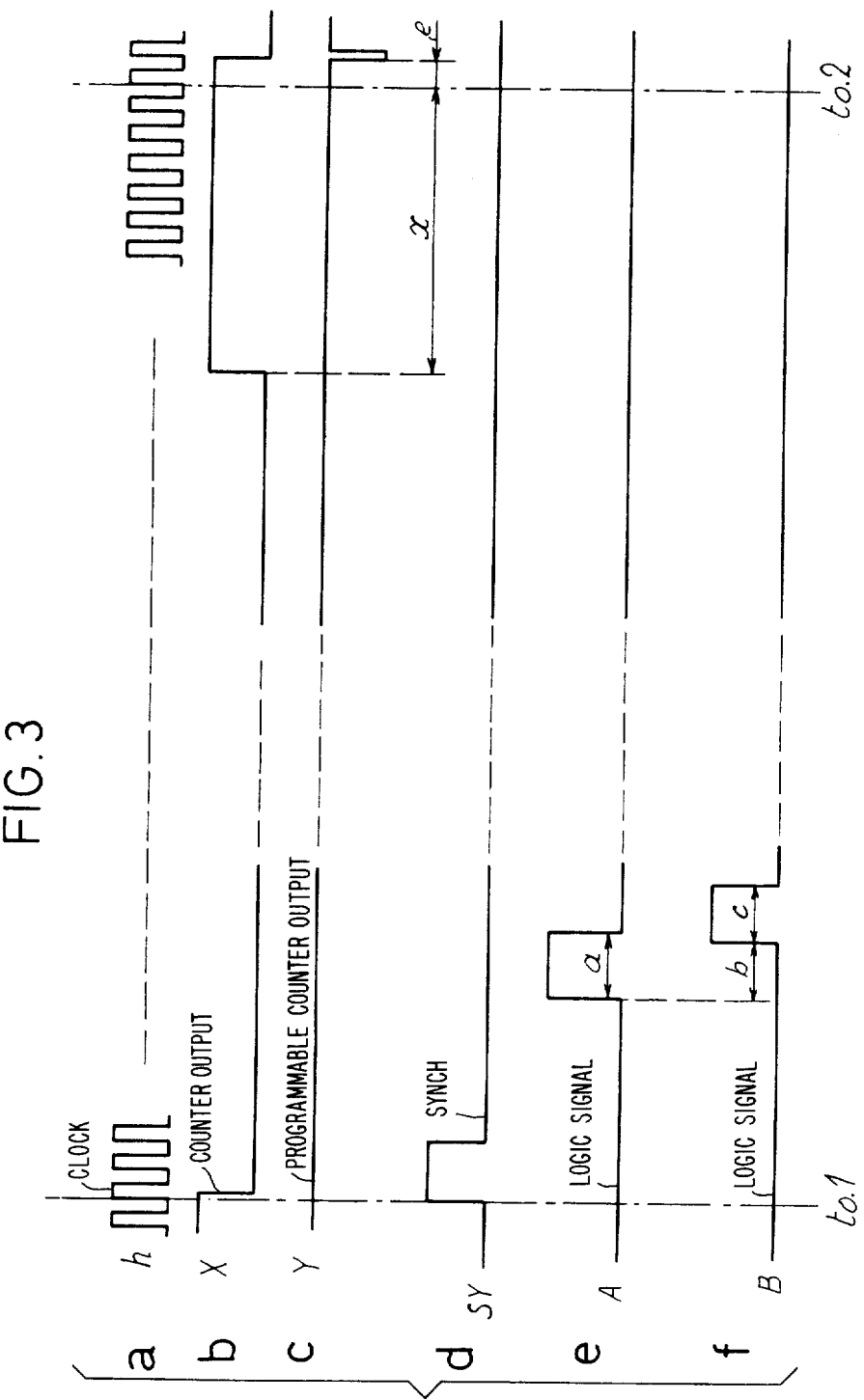

PROCESS AND A PERIODIC INSTANT REGENERATION CIRCUIT

The present invention concerns a process and a periodic instant regeneration circuit and, more particularly, the circuit of the invention allows the regeneration of the significant instants of a periodic signal whose periodicity has been deteriorated either by the presence of parasitic phenomena, or through the momentary disappearance of the periodic information.

BACKGROUND

As an example, the regeneration circuit in accordance with the invention is applicable in the demodulators of teletext broadcast system such as the one described in U.S. Pat. No. 4,058,830 and FR-A-2,313,825, this system being known and used in France under the name DIDON. In the data broadcast systems, the data packets carried by the television lines are positioned in these lines at a fixed time lapse after the line synchronization signal. In over the air transmissions, the signal to noise ratio often fluctuates such that the line synchronization signal is not received. The television receiver circuits are such that, under these conditions, they restore an acceptable picture because the analog signal varies only slightly from one line to the next and because interlaced sweeping is used. However, in data transmission, there is no correlation between the data streams on two different lines. We must therefore have, at each line a synchronization signal.

SUMMARY OF THE INVENTION

One object of the invention consists in providing a process to restore the significant instants of a periodic signal, even when this signal is absent, this signal being in the embodiment that will be described the line synchronization signal.

In accordance with a characteristic of the invention, a process is provided by which two signals are generated, a first signal allowing the detection of the periodic signal during a short period preceding the theoretical time position of the said periodic signal the second signal being transmitted a very short time after the theoretical time position of the said periodic signal and serving as substitute periodic signal when said periodic signal has not been detected before transmission of said second signal.

Another object of the invention consists in providing a circuit capable of carrying out the process defined above.

In accordance with another characteristic, a circuit is provided comprising a counter, a D flip-flop and a clock whose frequency is equal to a multiple of the bit rate of the received data stream, the counter having an initializing input connected to the Q output of the flip-flop, having two outputs respectively corresponding to the transmissions of the first and second signals, the first output being connected to the 1 resetting input while the second output is connected to the 0 resetting input of the flip-flop whose D input is connected to a voltage of level 0 and the clock input receives the periodic signal.

BRIEF DESCRIPTION OF THE DRAWINGS

The characteristics of the above-mentioned invention, as well as others, will appear clearer upon reading the following description of an embodiment, the said description being carried out in relation to the attached drawings among which.

DESCRIPTION OF PREFERRED EMBODIMENT

The periodic instant regeneration circuit in accordance with the invention is of general purpose. However, it has a particular purpose in data broadcast receivers, such as those of the French system DIDON.

In the DIDON system, the data packet carried by each line has as timing reference the synchronization signal of the line that carries it. It is therefore essential to regenerate these periodic reference instants in these receivers.

Figure 1:
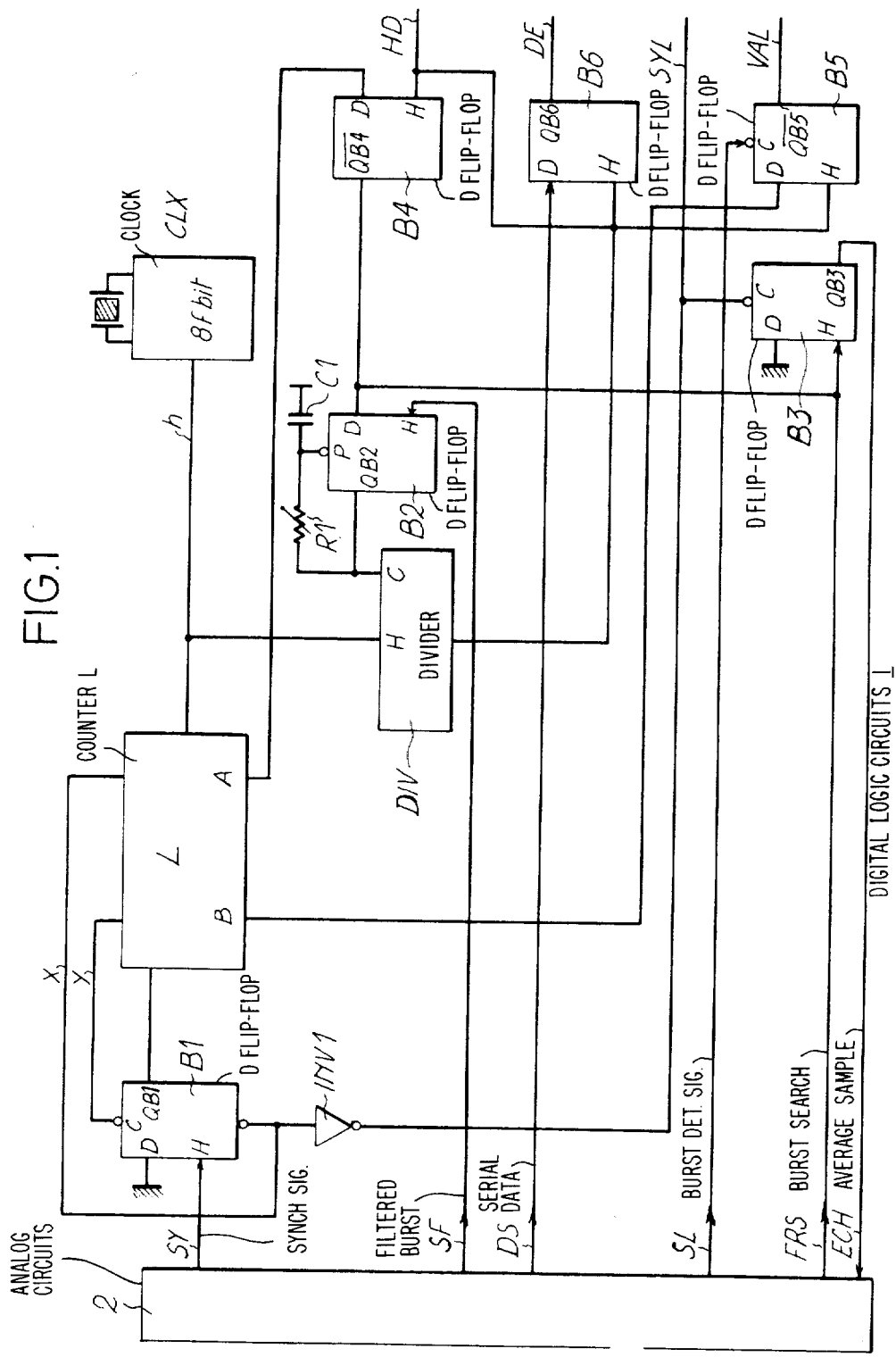
FIG. 1 illustrates the block diagram of a demodulator for a data broadcasting system comprising the regeneration circuit in accordance with the invention.

FIG. 1 represents in detail, a set 1 of logic circuits that are part of a DIDON demodulator, which also is comprised of an analog portion 2 which delivers to set 1, in SY, the complete synchronization signal, in DS, the serial data, in SF, the filtered burst and, in SL, the burst detection signal. The set 1 returns to the analog part 2, in ECH, the average value sampling signal and, in FRS, the burst search window.

On the other hand, the set 1 delivers to the utilization circuits, in HD, the data bit clock, in DE, the sampled data, in SYL, the line synchronization and in VAL, the packet validation signal.

In set 1, FIG. 1, the complete synchronization signal input SY is connected to the clock input of D-type flip-flop B1, whose D input is connected to ground, the 0 setting "C" input to the Y output of a programmable counter, the 1 resetting "p" input to the output X of counter L and output QB1 to the zero resetting input of counter L. In practice, as will be shown below, the programmable counter L, serves as a time base whose reinitialization instants are the regenerated periodic instants in accordance with the invention.

The clock input of counter L is connected to the output of a quartz clock CLX whose frequency is set at eight times the bit rate of the DIDON data. The X output of counter L is also connected, by an inverter INV1, on one hand, to the 0 resetting "c" input of the flip-flop B3 and, on the other hand, to the SYL output.

The B2 flip-flop has its clock input H connected to the filtered burst signal input SF, its D input connected to the $\overline{Q}_{B4}$ output of the flip-flop B4, and its $Q_{B2}$ connected, on one hand, to the "c" input of a divide-by-eight frequency divider DIV and, on the other hand, to its 1 resetting "p" input through a variable resistor R1, this "p" input being also connected to ground by a capacitor C1. The set comprising the flip-flop B2, the resistor R1 and the capacitor C1 make up a monostable circuit which is set to 1 slightly after the $Q_{B2}$ output crosses the 0 level.

The flip-flop B3 has its clock input connected to the $\overline{Q}_{B4}$ output of flip-flop B4, its D input connected to ground and its $Q_{B3}$ output connected to the ECH output.

The flip-flop B4 also has its $\overline{Q}_{B4}$ output connected to the FRS output, its clock input H connected to the output of divider DIV and its D input connected to the A output of programmable counter L.

The counter L also has an output B connected to the D input of a flip-flop B5 whose clock input H is also connected to the output of divider DIV, the "c" input to the burst detection signal input and the $\overline{Q}_{B5}$ output to the VAL output.

Finally, the set 1 also comprises a flip-flop B6 whose D input is connected to the serial data input DS, the clock input H to the output of divider DIV and the $Q_{B6}$ output to the data output DE.

Figure 2:
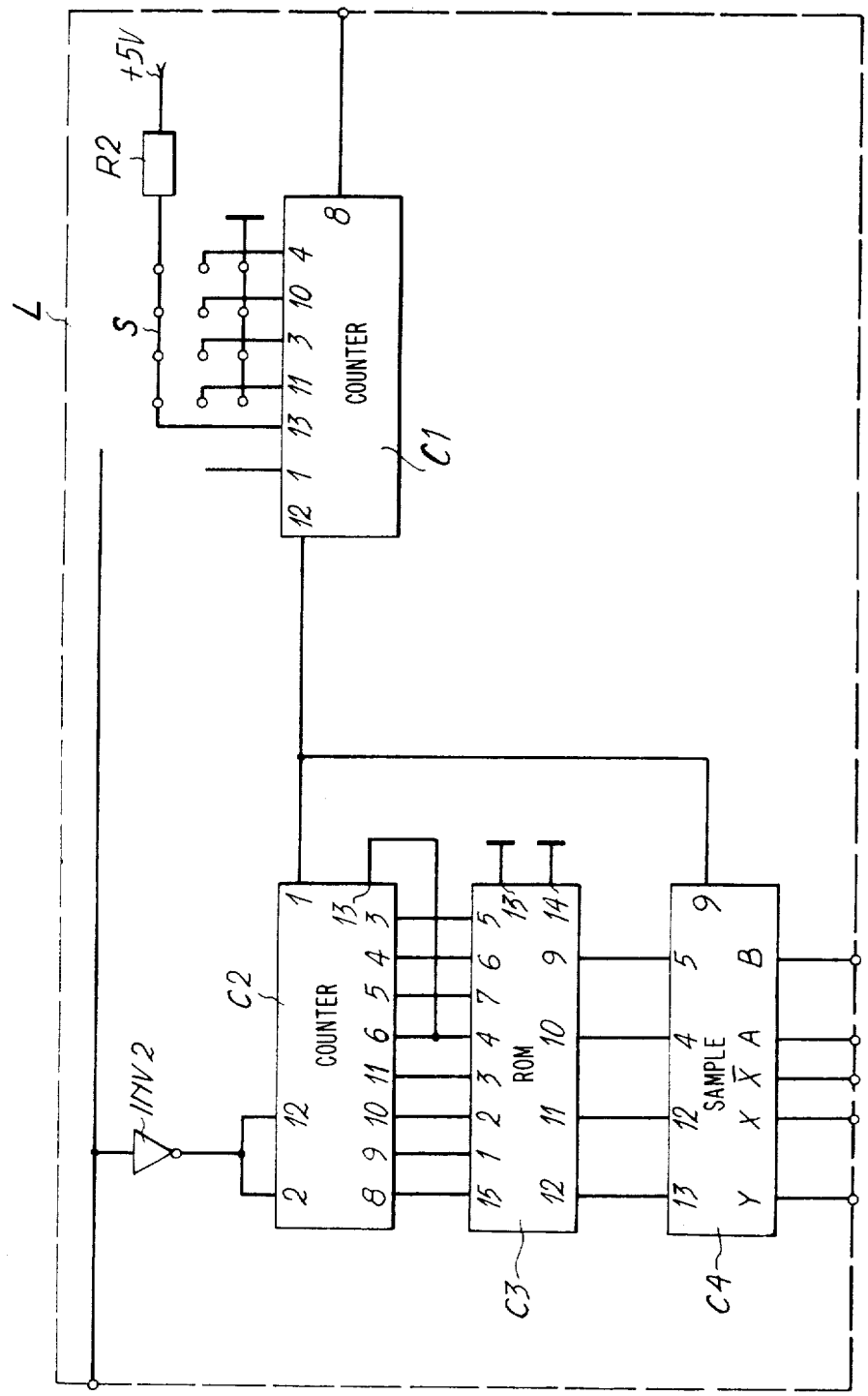
FIG. 2 is the schematic of a programmable counter used in the demodulator of FIG. 1, and FIGS. 3a to 3f are timing diagrams illustrating the operation of the circuits of FIGS. 1 and 2.

An embodiment of a programmable counter L is represented in FIG. 2. It comprises four circuits C1 to C4 whose technical and commercial references are respectively 74LS197, 74LS393, 6301 and 74LS175. The circuits C1 and C2 are counters and circuit C3 is a READ only memory. The counters C1 and C2 are used to address memory C3. The circuit C4 samples the output signals from memory C3.

Pin B from circuit C1 is connected to the output from clock CLX, pins 11, 3, 10 and 4 are connected together to a first set of contacts, its pin 13 is connected by second contacts in series with a resistor R2, itself connected to a +5 V source. Switches allow one to select the output phase of counter or divide by 16 C1, by selectively coupling first and second contacts, on one hand, and first and third contacts to ground on the other hand. Pin 1 for initial phase programming of circuit C1 is connected to QB1 output of flip-flop B1, and its pin 12 is connected to pin 1 of circuit C2.

In circuit C2, pins 2 and 12 are connected to the $Q_{B1}$ output of flip-flop B1 through an inverter INV2. In other regards, its 8, 9, 10, 11, 6, 5, 4, 3 outputs are respectively connected to pins 15, 1, 2, 3, 4, 7, 6, 5 of circuit C3. Finally, pin 6 of C2 is connected to its pin 13.

In circuit C3, pins 13 and 14 are connected to ground and pins 12, 11, 10 and 9 are respectively connected to pins 13, 12, 4 and 5 of circuit C4.

In circuit C4, pin 9 is connected to output pin 12 of circuit C1 and pins 14, 10, 11, 3 and 7 respectively constitute the output terminals Y, X, $\overline{X}$, A and B of logic circuit L. Observe that the $\overline{X}$ output allows the removal of the inverter circuit INV1 in FIG. 1.

The FIGS. 3a to 3f are timing diagrams respectively illustrating the clock CLX output signal h, the X signal at output X, the Y signal at output Y, the external synchronization signal SY, the A signal at output A and the B signal at output B of logic circuit L. It is apparent that the leading edge of signal X is emitted x bits before the leading edge of the television line synchronization signal while signal Y is generated at the count of y bits. The count x occurs slightly before the expected end of the television line while count y corresponds to a time which follows the next line synchronization signal.

By referring to the circuit of FIG. 1, it is apparent that the X signal sets flip-flop B1 to 1 outside the "x" window. If the line synchronization signal of the next line appears before the Y signal, it immediately causes the $Q_{B1}$ output to go to the 0 state which immediately reinitializes the phase of divider C1. That is the case illustrated in the left portion of FIGS. 3b to 3d where signal SY occurs at instant to.1. In this case, the Y signal is not transmitted.

If as shown in the right portion of FIGS. 3b to 3d, the synchronization signal SY, expected at to.2, has not yet occurred when signal Y appears, it is this signal which resets flip-flop B1 to "0" which also causes the phase of divider C1 to be reinitialized.

It is thus apparent that in practice, the signals X and Y together define a window in which the synchronization signal is expected. If it appears, the new window generation process is immediately reinitialized. If it has not appeared in the window, the window is not reinitialized. In this last case, the next X signal will be delayed by a value e corresponding to the time interval e between to.2 and signal Y, such as shown in FIG. 3c. In principle, the advance of signal X on the synchronization signal x of FIG. 3b, is selected to be of the order of fifteen times larger than e, such as to be immediately able to restore external synchronization if the absence of synchronization signal lasts less than fifteen consecutive lines.

It should be noted that the response time of flip-flop B1, which is connected to signal Y, is included in the time of the slave loop made up by counter L and flip-flop B1.

It is clear from FIGS. 1 and 2 that the X and Y signals are defined through counting from oscillator CLX whose frequency has been selected at eight times the bit rate. Their timing positions thus depend on the bit rate used as well as the duration of a television line, which varies depending on the standard used. In practice, within the 525 line standard, the bit rate is 5.727272 Mbit/s, that is 364 times the line frequency. In the 625 line standard, we can select a bit rate of 6.203125 Mbit/s, that is 397 times the line frequency, or of 6.937500, that is 444 times the line frequency.

One can define the X count by $X = N - 2$ and the Y count by $Y = N + e$, with $N = (F\,bit)/(F\,line)$ and $e = 1/(8F\,bit)$. For the 625 line standard, we thus obtain $X = 320$ ns and $e = 20$ ns.

The signal A which defines the synchronization burst search is located 10.5 microseconds after the leading edge of the line synchronization. Thus, the count to be carried out by counter L to generate the signal A varies in terms of the standards mentioned above, among the three values 60, 65 and 73. Then, the width a of impulse A, FIG. 3e, is equal to $12/(F\,bit)$, whatever the standard might be.

Similarly, the time lapse b between the leading edge of signal A and the leading edge of signal B is equal to $18/(F\,bit)$ and the width c of signal B is equal to $8/(F\,bit)$.

In practice, flip-flop B4 is used to sample signal A and, through flip-flop B2 to initialize the divide-by-eight divider DIV which restores the bit rate. The bit rate is used in flip-flops B5 and B6 to transmit the validation signal VAL and the data DE.

I claim:

1. A circuit for restoration of significant instants of a periodic signal having a deteriorated periodicity by generating a first signal for enabling a detection of the periodic signal during a short time preceding each of cyclically recurring theoretical timing positions of said periodic signal, generating a second signal a short time after each of the theoretical timing positions of said periodic signal, and substituting said second signal for said periodic signal when said periodic signal is not detected before the generation of said second signal, said circuit comprising:

a counter (L), a D flip-flop (B1) and a clock (CLX) feeding the counter (L); the counter (L) having an initialization input connected to the Q output of said flip-flop (B1), the counter (L) having first and second outputs (X, Y) respectively corresponding to the first and second signals, the first output (X) being a logical "1" setting while the second output is a logical "0" resetting input of said flip-flop (B1)

whose D input is connected to a 0 level voltage; and a clock input of said flip-flop receiving the periodic signal.

2. A circuit in accordance with claim 1, for use in a receiver of a data broadcast system, said data being transmitted and received at a data bit rate and including a periodic line synchronization signal characterized in that the clock frequency is equal to a multiple of the data bit rate, the periodic signal being the line synchronization signal.

* * * * *